United States Patent
Shoham et al.

(10) Patent No.: US 10,496,299 B2
(45) Date of Patent: Dec. 3, 2019

(54) EFFICIENT CONTENT-ADDRESSABLE MEMORY ENTRY INTEGRITY CHECKING INCLUDING FOR PROTECTING THE ACCURACY OF PACKET PROCESSING OPERATIONS

(71) Applicant: Cisco Technology, Inc., San Jose, CA (US)

(72) Inventors: Doron Shoham, Shoham (IL); Ilan Lisha, Hadera (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/954,539

(22) Filed: Apr. 16, 2018

(65) Prior Publication Data
US 2019/0317674 A1  Oct. 17, 2019

(51) Int. Cl.
 G06F 11/10 (2006.01)
 G06F 16/903 (2019.01)
 G06F 3/06 (2006.01)

(52) U.S. Cl.
 CPC .......... G06F 3/0619 (2013.01); G06F 3/0653 (2013.01); G06F 3/0679 (2013.01);
 (Continued)

(58) Field of Classification Search
 CPC ....... G11C 29/52; G06F 3/0659; G06F 3/619; G06F 3/0653; G06F 3/0679
 See application file for complete search history.

(56) References Cited

U.S. PATENT DOCUMENTS 5,491,703 A * 2/1996 Barnaby et al. ...... H03M 13/00
 371/40.1
6,000,008 A * 12/1999 Simcoe ............... G06F 12/00
 711/108

(Continued)

OTHER PUBLICATIONS

Bremler-Barr, Anat et al., "PEDS: A Parallel Error Detection Scheme for TCAM Devices", Oct. 2010, IEEE/ACM Transactions on Networking vol. 18. (Year: 2010).*

(Continued)

*Primary Examiner* — Tracy A Warren
(74) *Attorney, Agent, or Firm* — The Law Office of Kirk D. Williams

(57) ABSTRACT

In one embodiment, efficient content-addressable memory entry integrity checking is performed that protects the accuracy of lookup operations. Single-bit position lookup operations are performed resulting in match vectors that include a match result for each of the content-addressable memory entries at the single-bit position. An error detection value is determined for the match vector, and compared to a predetermined detection code for the single-bit position to identify whether an error is detected in at least one of the content-addressable memory entries. In one embodiment, a particular cumulative entry error detection vector storing entry error detection information for each of the content-addressable memory entries is updated based on the match vector. The particular cumulative entry error detection vector is compared to a predetermined entry error detection vector to determine which, if any, of the content-addressable memory entries has an identifiable error, which is then corrected.

10 Claims, 7 Drawing Sheets

(52) U.S. Cl.
CPC .......... *G06F 11/10* (2013.01); *G06F 11/1076* (2013.01); *G06F 16/90339* (2019.01)

(56) References Cited

U.S. PATENT DOCUMENTS

| | | | |
|---|---|---|---|
| 6,374,326 B1 | 4/2002 | Kansal et al. | |
| 6,389,506 B1 | 5/2002 | Ross et al. | |
| 6,526,474 B1 | 2/2003 | Ross | |
| 6,535,951 B1 | 3/2003 | Ross | |
| 6,597,595 B1 * | 7/2003 | Ichiriu et al. | G11C 15/00 365/49 |
| 6,606,681 B1 | 8/2003 | Uzun | |
| 6,715,029 B1 | 3/2004 | Trainin et al. | |
| 6,738,862 B1 | 5/2004 | Ross et al. | |
| 6,870,749 B1 * | 3/2005 | Park et al. | G11C 7/00 365/49 |
| 6,871,262 B1 | 3/2005 | Oren et al. | |
| 6,914,795 B1 * | 7/2005 | Srinivasan et al. | G11C 15/00 365/49 |
| 6,987,684 B1 * | 1/2006 | Branth et al. | G11C 15/00 365/49 |
| 7,043,673 B1 * | 5/2006 | Ichiriu et al. | G11C 29/00 714/719 |
| 7,103,708 B2 | 9/2006 | Eatherton et al. | |
| 7,257,672 B2 | 8/2007 | Shoham et al. | |
| 7,260,673 B1 | 8/2007 | Ross | |
| 7,290,083 B2 | 10/2007 | Shoham et al. | |
| 7,305,519 B1 | 12/2007 | Nagaraj | |
| 7,345,897 B2 | 3/2008 | Krishnan et al. | |
| 7,349,230 B2 | 3/2008 | Parthasarathy et al. | |
| 7,350,131 B2 | 3/2008 | Trainin | |
| 7,986,696 B1 * | 7/2011 | Miliavisky et al. | H04L 12/56 370/392 |
| 8,848,412 B1 * | 9/2014 | Yeung et al. | G11C 15/00 365/49.1 |
| 8,887,026 B2 | 11/2014 | Bremler-Barr et al. | |
| 10,387,251 B2 * | 8/2019 | Shoham | H03M 13/05 |
| 2012/0117431 A1 * | 5/2012 | Bremler-Barr et al. | G11C 29/52 |
| 2016/0283316 A1 * | 9/2016 | Abali et al. | G06F 11/10 |
| 2017/0206129 A1 * | 7/2017 | Yankilevich et al. | G06F 11/1064 |

OTHER PUBLICATIONS

Bremler-Barr et al., "PEDS: A Parallel Error Detection Scheme for TCAM Devices," IEEE/ACM Transactions on Networking, vol. 18, No. 5, Oct. 2010, IEEE, New York, New York (eleven pages).

Isidoros Sideris and Kiamal Pekmestzi, "Cost Effective Protection Techniques for TCAM Memory Arrays," IEEE Transactions on Computers, vol. 61, No. 12, Dec. 2012, IEEE, New York, New York (eleven pages).

Shafiq et al., "TCAMChecker: A Software Approach to the Error Detection and Correction of TCAM-Based Networking Systems," Journal of Network and Systems Management, vol. 21 Issue 3, Sep. 2013, ACM, New York, New York (eighteen pages).

Rasmussen et al., "TCAM-based High Speed Longest Prefix Matching with Fast Incremental Table Updates," 2013 IEEE 14th International Conference on High Performance Switching and Routing (HPSR), Jul. 2013, IEEE, New York, New York (six pages).

* cited by examiner

EFFICIENT CONTENT-ADDRESSABLE MEMORY ENTRY INTEGRITY CHECKING INCLUDING FOR PROTECTING THE ACCURACY OF PACKET PROCESSING OPERATIONS

TECHNICAL FIELD

The present disclosure relates generally to content-addressable memories, including those used in forwarding packets in a network based on lookup results (e.g., longest prefix matching) in a hardware content-addressable memory (e.g., a binary or ternary content-addressable memory).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Content-addressable memories are particularly useful in performing lookup operations in determining how to forward a packet in a network by a packet switching device. Errors can develop in data and/or masks stored in a content-addressable memory causing lookup operations to identify wrong packet processing information.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
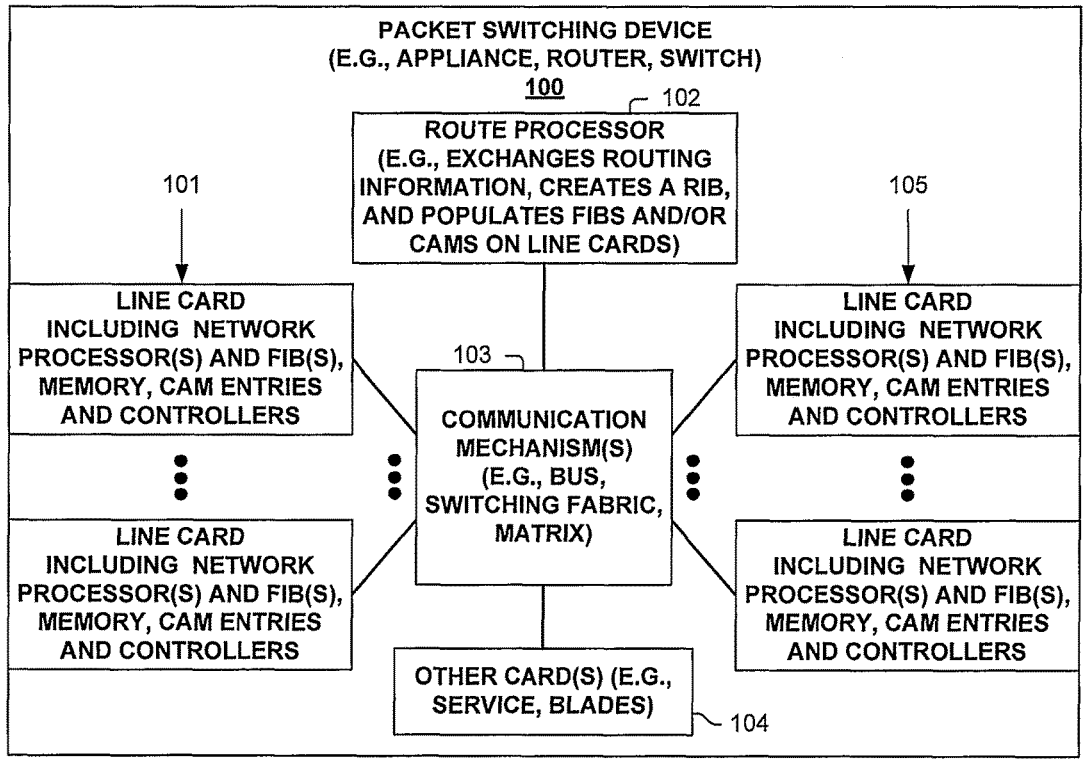
FIG. 1A illustrates a packet switching device including one or more content-addressable memories according to one embodiment.

Disclosed are, inter alia, methods, apparatus, computer-storage media, mechanisms, and means associated with efficient content-addressable memory entry integrity checking using single-bit position lookup operations, including for protecting the accuracy of packet processing operations in one embodiment.

In one embodiment, a single-bit position lookup operation is performed in entries of a content-addressable memory against a particular bit value (i.e., zero or one) at a single-bit position within a lookup word resulting in a match vector that includes an entry match result at the single-bit position for each of the content-addressable memory entries. An error detection value (e.g., checksum, parity) is determined for the match vector. The error detection value is compared to a predetermined detection code for the single-bit position to identify whether an error is detected in the single-bit position of at least one of the content-addressable memory entries.

In one embodiment, a particular cumulative entry error detection vector storing entry error detection information for each of the content-addressable memory entries is updated based on the match vector. The particular cumulative entry error detection vector, possibly after a single-bit position lookup operation is performed for each bit position for the particular bit value, is compared to a predetermined entry error detection vector to determine which, if any, of the content-addressable memory entries has an identifiable error. When a specific entry is identified, the specific entry is corrected.

For certain bit errors (e.g., a single bit error) within the content-addressable memory operation, the errored position within the specific entry is identified by the single-bit position lookup operation identifying an error. Also, certain bit errors can be corrected by a controller associated with the associative memory entry by reading the erred vector from the identified entry, and write to the identified entry the vector after correcting the bit position such that a correct match will be produced by lookup operations. In one embodiment, single-bit position lookup operations are performed for each of a particular bit value of one and zero.

2. Description

Disclosed are, inter alia, methods, apparatus, computer-storage media, mechanisms, and means associated with efficient content-addressable memory entry integrity checking using single-bit position lookup operations, including for protecting the accuracy of packet processing operations in one embodiment. As used herein, the term "content-addressable memory" ("CAM") refers to a hardware-based content-addressable memory in which vectors stored in valid/enabled multiple content-addressable memory entries are simultaneously compared against corresponding bits of a lookup word. The term "content-addressable memory" ("CAM") includes different implementations, including a binary content-addressable memory (BCAM) and a ternary content-addressable memory (TCAM).

Herein, the programming or value of a content-addressable memory is referred to as a "vector." For a BCAM, a vector is typically a data value. For a TCAM, a vector is typically a data value and a mask value, with the mask value defining which bits are to be compared or ignored (e.g., wildcard bits) in a lookup operation. A content-addressable memory may also have a global bit mask register which stores a global masking vector that causes the masking of corresponding bits of each of multiple content-addressable memory entries in a scope of the lookup operation (e.g., all enabled and valid entries in a block of entries). A content-addressable entry matches a lookup word when all non-masked data bits of the vector populated therein match corresponding bits of the lookup word. The term "single-bit position lookup operation" is used herein to refer to a lookup operation in content-addressable memory entries in which all but one bit position of each of these entries is masked (e.g., by a global bit mask register, possibly one dedicated for integrity checking operations).

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first" "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1B:
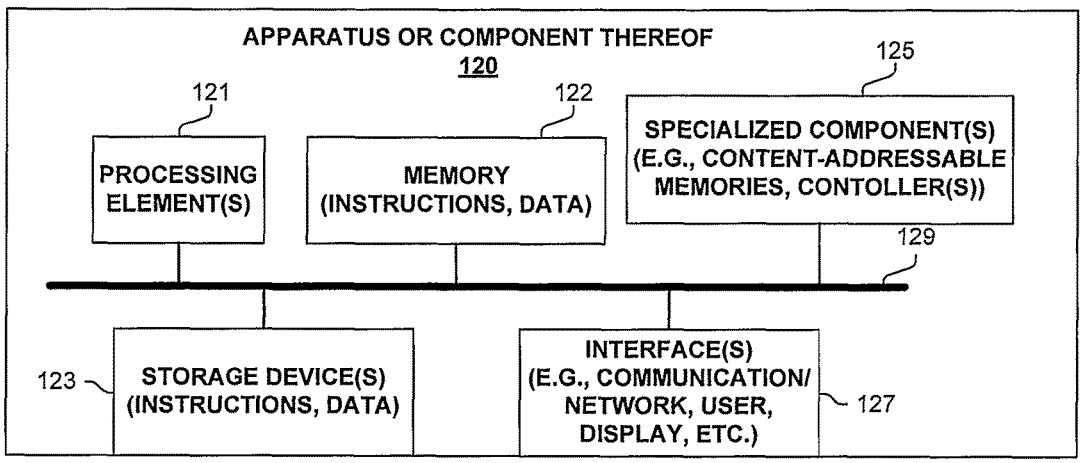
FIG. 1B illustrates an apparatus including one or more content-addressable memories according to one embodiment.

FIGS. 1A-B and their discussion herein are intended to provide a description of various exemplary packet switching systems used according to one embodiment that performs coordinated updating and searching of entries of a hardware content-addressable memory. This coordinated updating includes using transitory entries storing vectors that are searched (along with the content-addressable memory) in a lookup operation, with these vectors subsequently being programmed in entries of the content-addressable memory.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group). In one embodiment, apparatus 100 performs one or more processes, or portions thereof, corresponding to one of the flow diagrams illustrated or otherwise described herein, and/or illustrated in another diagram or otherwise described herein.

Line cards 101 and 105 typically include one or more content-addressable memories (and possibly controller(s)) for performing lookup operations in determining packet processing information, and with one or more processing elements that are used in one embodiment associated with efficient content-addressable memory entry integrity checking using single-bit position lookup operations including for protecting the accuracy of packet processing operations). Packet switching device 100 also has a control plane with one or more processing elements 102 for managing the control plane and/or control plane processing of packets. Packet switching device 100 also includes other cards 104 (e.g., service cards, blades) which include processing elements that are used in one embodiment to process packets (e.g., forward, drop, manipulate, throttle, police, schedule), and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, line cards 101 and/or 105 perform content-addressable lookup operations in determining how to ingress and/or egress process packets. Even though the term FIB includes the word "forwarding," this information base typically includes other information describing how to process corresponding packets (e.g., forward, drop, manipulate, throttle, police, schedule).

FIG. 1B is a block diagram of an apparatus 120 used in one embodiment associated with efficient content-addressable memory entry integrity checking using single-bit position lookup operations including for protecting the accuracy of packet processing operations. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware, content-addressable memory and possibly controller(s)), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment.

Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 2:
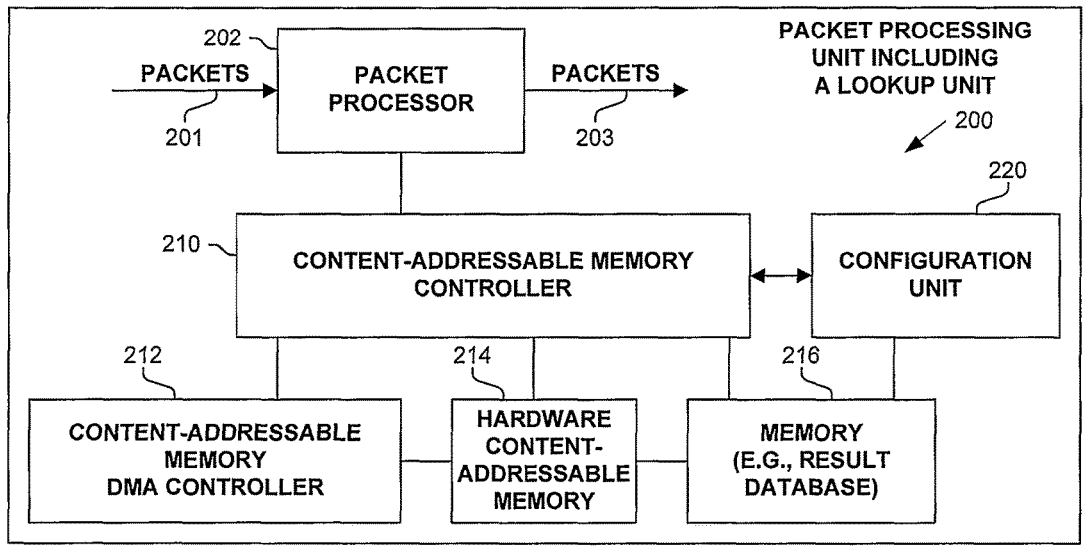
FIG. 2 illustrates a packet switching device including one or more content-addressable memories according to one embodiment.

FIG. 2 illustrates a packet processing unit 200 of one embodiment. Packet processor 202 receives and processes packets 201, and forwards non-dropped packets 203. The packet processing for a packet is based on the results of a lookup operation typically based on values extracted from a packet that identifies a stream to which the packet belongs.

Configuration unit 220 maintains one or more result databases in memory 216 (sometimes referred to as adjunct memory to content-addressable memory 214), and provides content-addressable memory controller 210 with instructions for updating hardware content-addressable memory 214. These instructions include, but are not limited to, vectors to populate (also referred to as store, program, insert, etc.) and at what locations in content-addressable memory 214, invalidate (also referred to as delete, remove) specified vectors in content-addressable memory 214, move specified vectors among entries in content-addressable memory 214. Content-addressable memory controller 210 uses content-addressable memory direct memory access (DMA) controller 212 to perform, inter alia, the actual movement of vectors among entries and insertion of vectors in entries of content-addressable memory 214.

In one embodiment, content-addressable memory controller 210 receives a lookup word from packet processor 202. Content-addressable memory controller 210 provides the lookup word to content-addressable memory 214, which performs a lookup operation thereon and returns a content-addressable memory lookup result, with a matching result then used to retrieve a lookup result from a corresponding database entry of memory 216. Content-addressable memory controller 210 receives the lookup result and provides it to packet processor 202.

Figure 3:
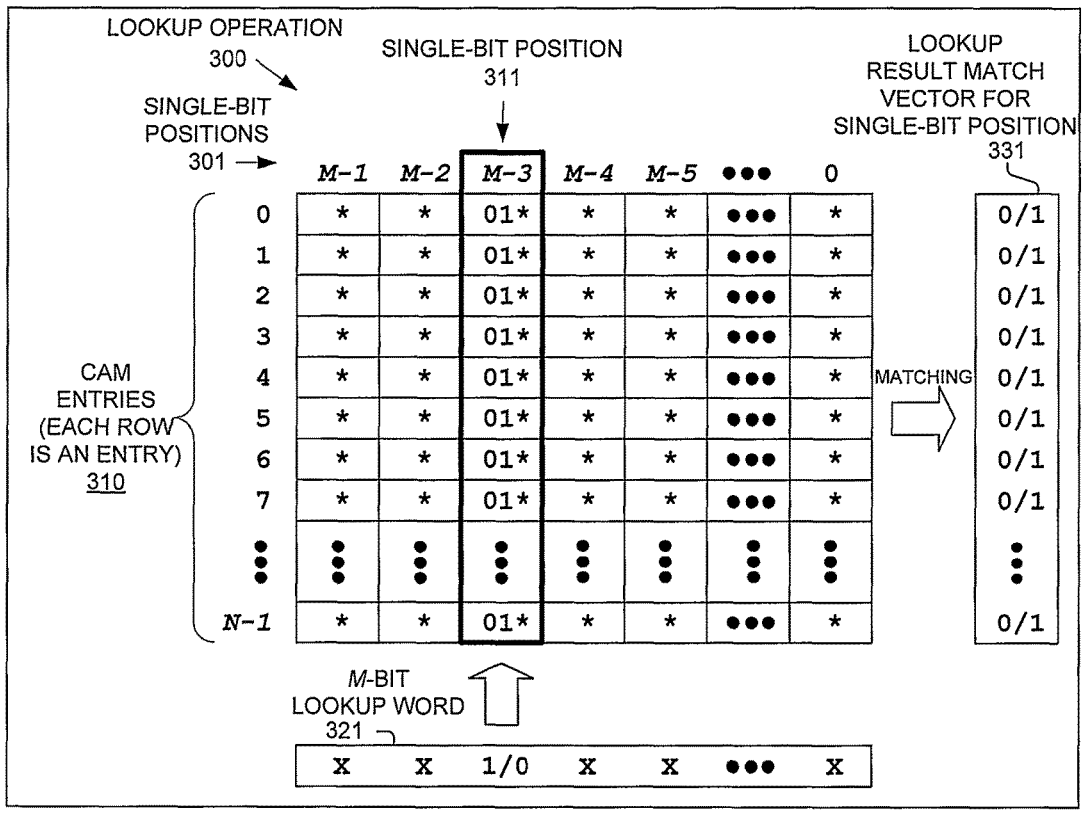
FIG. 3 illustrates a process according to one embodiment.

FIG. 3 illustrates a single-bit position lookup operation 300 according to one embodiment. Shown in FIG. 3 are N content-addressable memory entries 310 having M different bit positions 301. In one embodiment, each of these N content-addressable memory entries 310 participate in single-bit position lookup operations. In one embodiment, these N content-addressable memory entries 310 represent enabled/valid entries. In one embodiment, these N content-addressable memory entries 310 represent all entries, including entries (e.g., invalid/disabled) that do not participate in normal data lookup operations, with each of these invalid/disabled entries being programmed with a predetermined same or different vector for producing deterministic single-bit position lookup results as required for efficient content-addressable memory entry integrity checking.

Single-bit position 311 represents one of these bit positions 301 (specifically the third most high-order bit as shown) of each of content-addressable memory entries 310. In one embodiment, multiple content-addressable memory entries 310 represent a block/bank of entries, with the efficient content-addressable memory entry integrity checking using single-bit position lookup operations performed on a per or multiple block/bank basis.

In one embodiment, a global mask value (e.g., that stored in a global mask register or block mask register beforehand or received for the single-bit lookup operation 300) is used to mask the lookup operation on all bit positions except the single-bit position 311. The use of a '*' in FIG. 3 denotes a wildcard or don't care value, either stored or effective (e.g., result of being masked) for the lookup operation 300 being shown. In other words, result match vector 331 generated by lookup operation 300 is that of the matching of single-bit position 311 of each of CAM entries 310 compared to the value of single-bit position 311 of lookup word 321. Each bit of result match vector 331 reflects whether there is a match or not a match for the value stored in the single bit-position 311 of each of CAM entries 310 compared to the current value of zero or one of single-bit position 311 of lookup word 321.

Figure 4A:
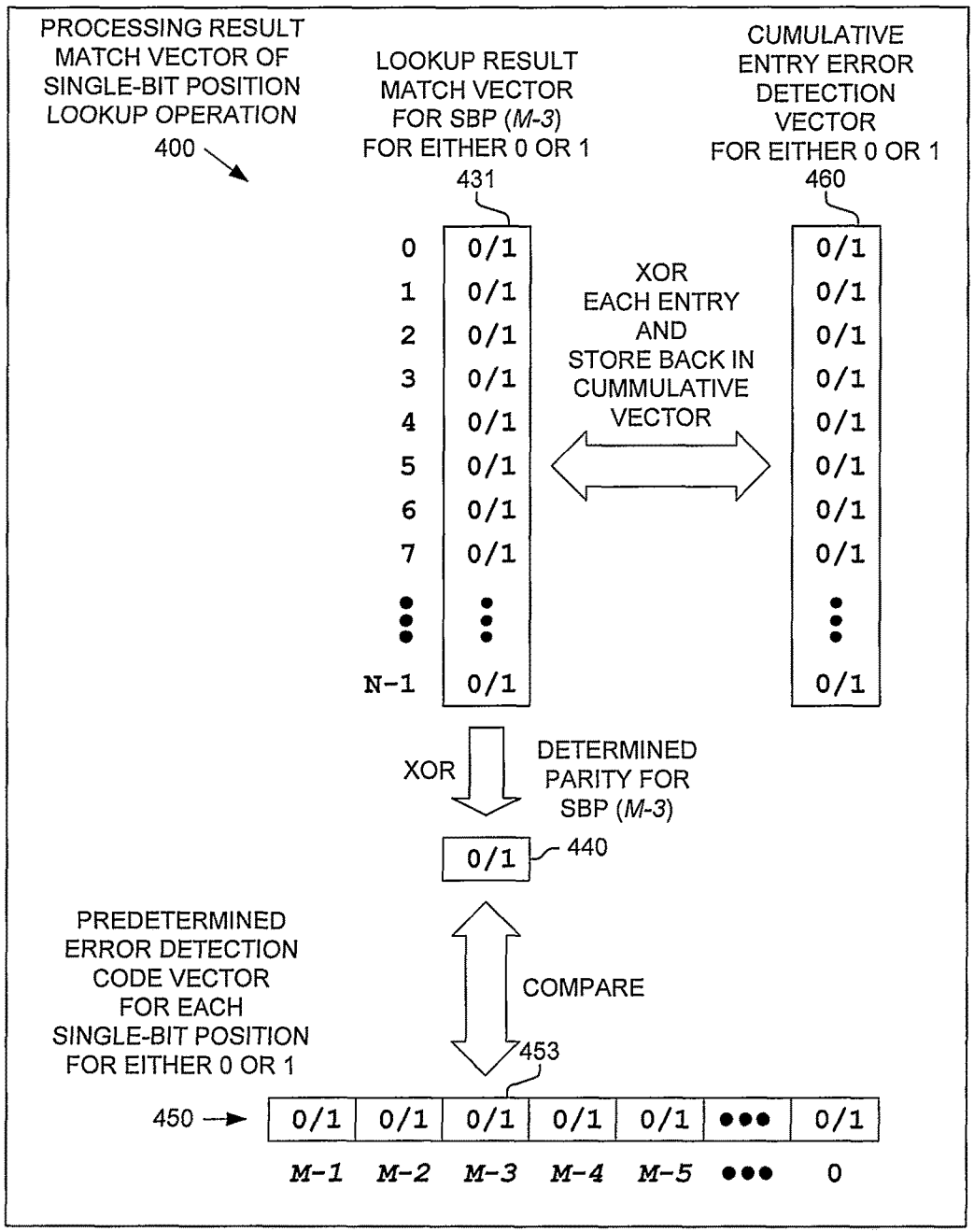
FIG. 4A illustrates a process according to one embodiment.

FIG. 4A illustrates the processing (400) of a result match vector 431 (e.g., result match vector 331 of FIG. 3) in the efficient content-addressable memory entry integrity checking of one embodiment. Each of the N matching results of 431 is XOR'd together (e.g., to determine a parity bit) 440 (or otherwise processed to determine a checksum or other error detection value), which is then compared to the corresponding bit position entry (453) of predetermined error detection code vector 450 for the bit value (i.e., zero or one) of the single-bit position lookup operation. A match between values 440 and 453 identifies that no error is detected (e.g., zero or an even number of errors in the lookup results of vector 431 when using parity as the error detection code). A difference between values 440 and 453 identifies that an error is detected (e.g., one or another odd number of errors in the lookup results of vector 431 when using parity as the error detection code). One embodiment uses to different predetermined error detection code vectors 450, one for each of the lookup bit values of zero and one.

Additionally, predetermined lookup result match vector 431 is XOR'd with a cumulative entry detection vector 460 (each of which for the bit value of the single-bit position lookup operation), with the result stored in the cumulative entry detection vector 460.

Figure 4B:
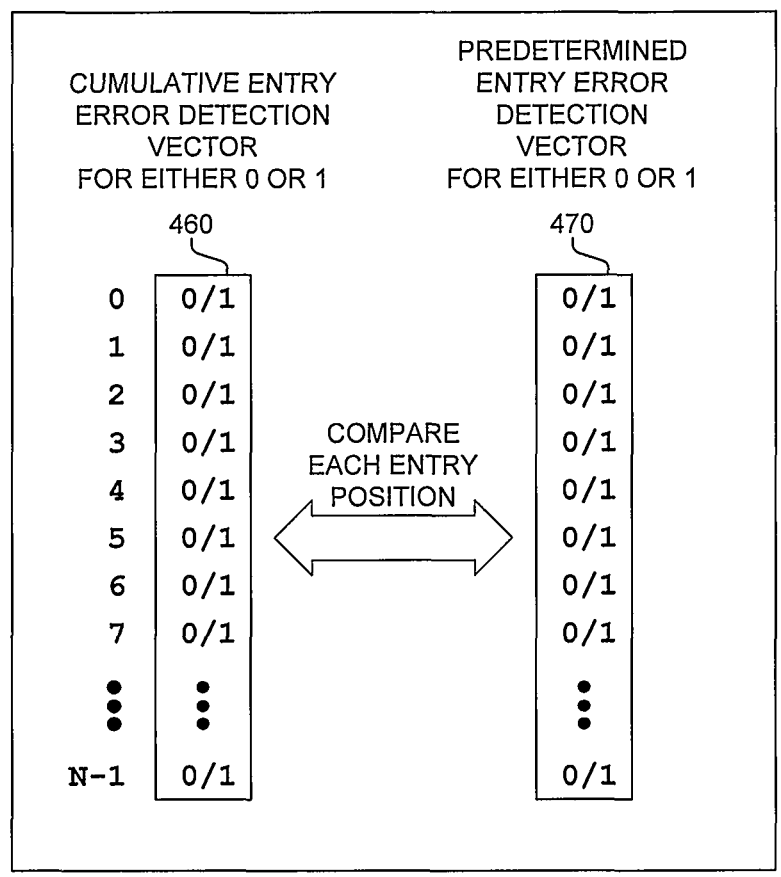
FIG. 4B illustrates a process according to one embodiment.

Further and as shown in FIG. 4B, after some predetermined number of single-bit position lookup operations for the lookup bit value (e.g., a predetermined subset number or number of a width of each content-addressable memory entry), the cumulative entry detection vector 460 is compared against a corresponding predetermined entry detection vector 470 for the lookup bit value for identifying errors in entries. One embodiment uses multiple predetermined entry detection vectors 470, each corresponding to a portion of the bit positions of a content-addressable memory entry such that this entry error detection operation is performed more often than only after checking all bits of an entry or after checking all bits of an entry for each bit value of zero and of one. A match in an entry position indicates no error is detected (e.g., zero or an even number of errors when using parity as the error detection code) for the corresponding entry, and a difference in an entry position indicates an error (e.g., one or another odd number of errors when using parity as the error detection code). One embodiment uses another methodology for determining which one or more entries have an error (e.g., in response to a detected single-bit position error).

Figure 5A:
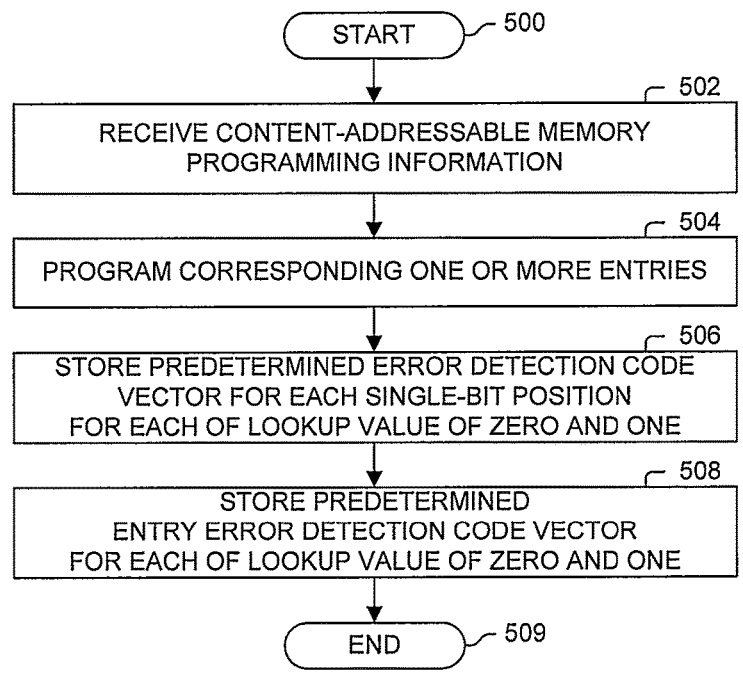
FIG. 5A illustrates a process according to one embodiment.

FIG. 5A illustrates a process according to one embodiment. Processing begins with process block 500. In process block 502, content-addressable memory programming information is received. In process block 504, corresponding entries of the content-addressable memory are programmed. In process block 506, the predetermined error detection code vectors are stored (possibly after determination if not externally provided). In process block 508, the predetermined entry error detection code vectors are stored (possibly after determination if not externally provided). Processing of the flow diagram of FIG. 5A is complete as indicated by process block 509.

Figure 5B:
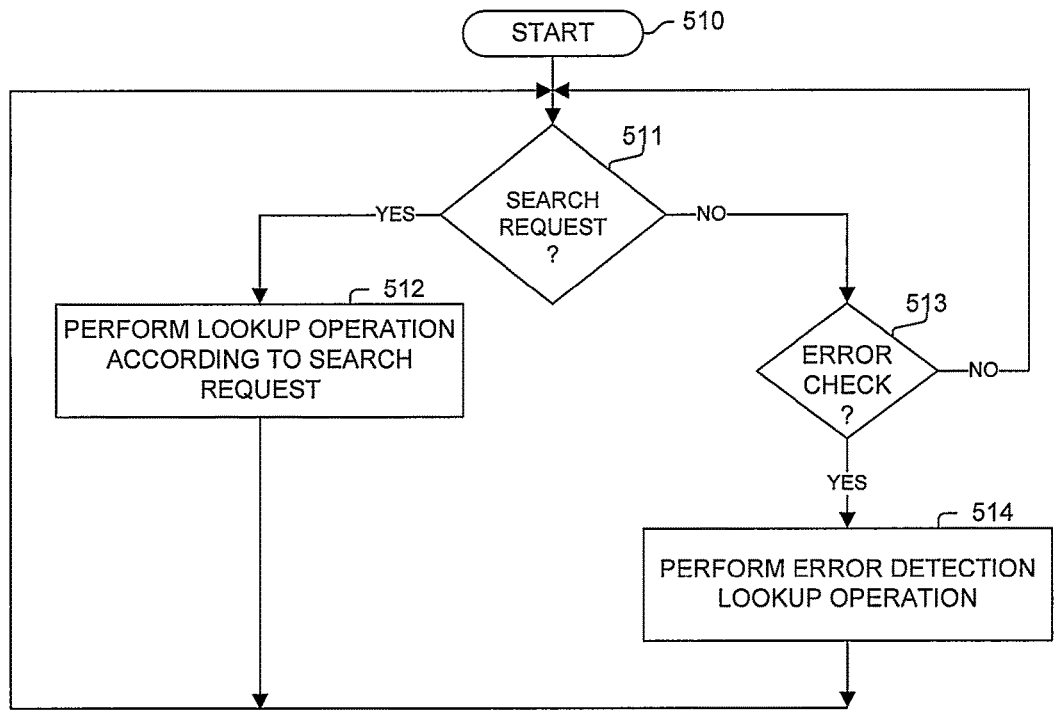
FIG. 5B illustrates a process according to one embodiment.

FIG. 5B illustrates a process according to one embodiment. Processing begins with process block 510. As determined in process block 511, in response to a content-addressable memory search request being available, then the lookup operation based on the search request is performed in process block 512; otherwise, processing proceeds to process block 513. As determined in process block 513, if an error detection and correction operation should be performed (e.g., as a timer has expired, or another event occurred), then in process block 514 an integrity checking single-bit position lookup operation is performed in process block 514. Processing returns to process block 511.

Figure 6:
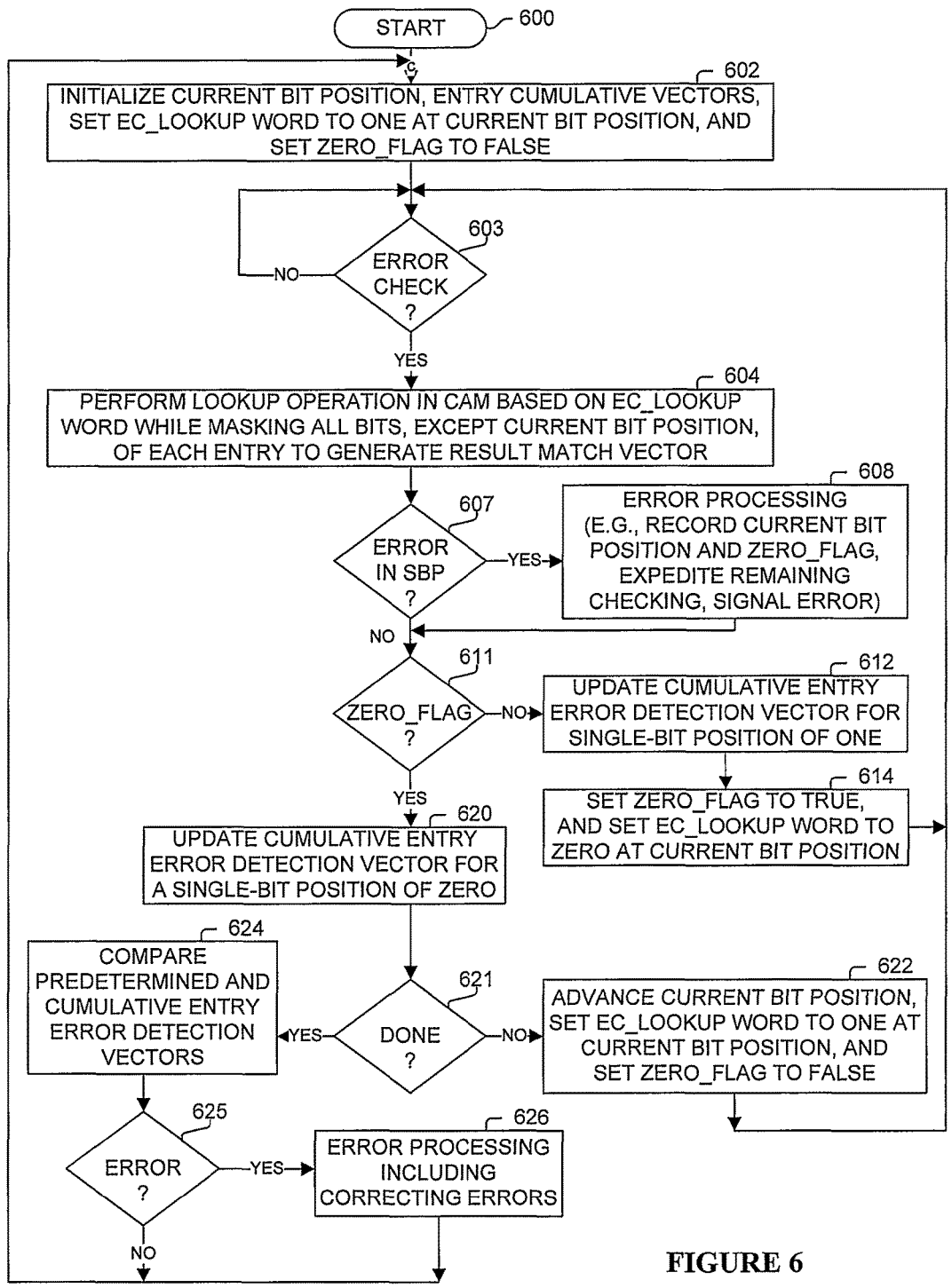
FIG. 6 illustrates a process according to one embodiment.

FIG. 6 illustrates a process according to one embodiment. One embodiment sequences through the (N) single-bit positions for the bit values of one and zero in a deterministic or non-deterministic manner such that each of these combinations is checked for all of the (M) content-addressable memory entries.

The particular processing illustrated by one embodiment and as shown in FIG. 6 is to start at single-bit position zero (or N−1 e.g., for N bit positions), error check for the single-bit value of one at this position, error check for the single-bit value of zero at this position, advance to the next single-bit position of one (or N−2), error check for the single-bit value of one at this position, error check for the single-bit value of zero at this position, and so on until all of the (N) single-bit positions for each of the bit values of one and zero have been checked (as determined in process block 621).

In illustrating the processing of FIG. 6, a variable current bit position is used to identify a bit position on which to currently perform a single-bit lookup operation. Additionally, zero_flag is used to indicate whether to perform a lookup operation using a single-bit position value of one (first time) or zero (second time) at the current bit position. Finally, EC_lookup word is the lookup word used in the single-bit lookup operation on the content-addressable memory entries, with only its value (one or zero) at the current bit position being important as the lookup operation masks the results of comparison operations at other bit positions (e.g., using a global bit mask).

Processing begins with process block 600. In process block 602, the current bit position is initialized (e.g., to zero or N−1), the bit of EC_lookup word at current bit position is set to one, zero_flag is set to false, and cumulative entry error detection vectors (for each of bit value one and zero) are each initialized to some predetermined value (e.g., set to all zeros or all ones for simplicity).

Processing continues to process block 603 to wait until an error detection operation is to be performed (e.g., as a timer has expired, or another event occurred), then processing proceeds to process block 604. In one embodiment, after an error has been detected (in process block 607) by a previous iteration of the processing of process blocks 604-622 then processing will continue from process block 603 to process block 604 without pausing (e.g., to allow for intermitted data lookup operations) in order to expedite the integrity checking of all content-addressable memory entries.

Continuing processing in process block 604, a single-bit position lookup operation to generate the result match vector is performed in the content-addressable memory entries with a lookup word of EC_lookup word, which accordingly has a value of one or zero in the current bit position (with all other bit positions masked during the lookup operation).

As determined in process block 607, if there is an error detected in the single-bit position for the lookup bit value of one or zero (e.g., by computing an error detecting code on the match vector and comparing it to a predetermined value), then processing proceeds to process block 608 and then to process block 611; otherwise if no error has been detected then processing proceeds directly to process block 611.

Continuing in process block 608, error processing is performed such as, but not limited to, recording the current bit position and whether a single-bit value of one or zero was used in the lookup operation, signaling the error to another device or process, initiate expedited error detection processing (e.g., so no future pausing at process block 603), and/or exiting the processing within FIG. 6 and reprogramming all content-addressable memory entries or taking other error correction actions. If processing has not been terminated, then processing proceeds to process block 611.

The single-bit value and position for the next single-bit position lookup operation is determined in process blocks 611-622 or that all error checks have been done as determined in process block 621.

As determined in process block 611, if zero_flag is false indicating to next check for a single-bit value of zero, then processing proceeds to process block 612; otherwise processing proceeds to process block 620.

Continuing in process block 612, the cumulative entry error detection vector for the single-bit value of one is updated based on the result vector. Then in process block 614, zero_flag is set to true indicating to next check for a single-bit value of zero, and processing returns to process block 603 to continue efficient error checking.

Continuing in process block 620, the cumulative entry error detection vector for the single-bit value of zero is updated based on the result vector. Then, as determined in process block 621, if all single bit positions have been checked, then processing proceeds to process block 624; otherwise, efficient error checking is continued in process block 622 by advancing the current bit position to the next bit position and setting zero_flag to false (next check for a bit value of one), and processing returns to process block 603.

Continuing in process block 624, the cumulative and predetermined entry error detection vectors for each of single-bit values of one and zero are compared to identify zero or more entries that have an error. As determined in process block 625, if no error was detected in the processing of FIG. 6 (e.g., in accordance with process blocks 625 and/or 607), then processing proceeds directly to process block 602 to restart the efficient error detection processing; otherwise in response to a detected error, then processing proceeds to process block 626 to perform error processing (typically correcting errors) and then proceeds to process block 602 to restart the efficient error detection processing.

In one embodiment, each specific entry identified as having an error by the comparison operations of process block 624 is corrected. One embodiment then immediately repeats the processing of FIG. 6 (with or without allowing pausing at process block 603).

One embodiment correlates and corrects an error detected in a single-bit position (e.g., as determined in process block 607) with a specific entry identified as having an error by the comparison operations of process block 624. For certain bit errors (e.g., a single bit error) within the content-addressable memory operation, the errored position within the specific entry is identified by the single-bit position lookup operation identifying an error. One embodiment verifies that there was a single error by reading the currently stored vector from the error-identified content-addressable memory entry and compares it with the original vector (e.g., data for a BCAM, data/mask for a TCAM) programmed therein. Also, certain bit errors can be corrected by a controller associated with the associative memory entry by reading the erred vector from the identified entry, and writing the vector after correcting the bit position to the identified entry.

One embodiment correlates (and corrects) an error detected in a single-bit position (e.g., as determined in process block 607) with of a specific entry identified as having an error by the comparison operations of process block 624, possibly based on whether or not an error was detected in the single-bit position for the opposite lookup word bit value of zero or one.

The efficient error detection includes detection of an error on results of single-bit value lookup operations, and not simply via reading the current value of vectors in content-addressable memory entries (possibly each stored with a parity bit). For binary content-addressable memories, a currently stored value of a vector is directly confirmable based on a match of a lookup value zero or one. One embodiment uses the matching patterns of identified and not identified errors in determining the cause of a detected error. For example, if an error is detected for only one entry and in one single-bit position lookup value for both values of zero and one, then the data bit has flipped (so reading and flipping the errored data bit will correct the entry).

However, a vector of a ternary content-addressable memory entry includes both data and a mask, with either or both of these values possibly becoming errored in one or more bit positions. In one embodiment, if an entry has a data bit that flips in value with the correct vector of that entry masking the flipped bit, a lookup operation will produce the correct result and therefore is not identified as an error in one embodiment. One embodiment uses the matching patterns of identified and not identified errors in determining the cause of a detected error. For example, if an error is detected for only one entry and in one single-bit position lookup value for both values of zero and one, then the corresponding mask bit is set to no masking, and the data bit has flipped (so reading and flipping the errored bit will correct the entry).

Figure 7:
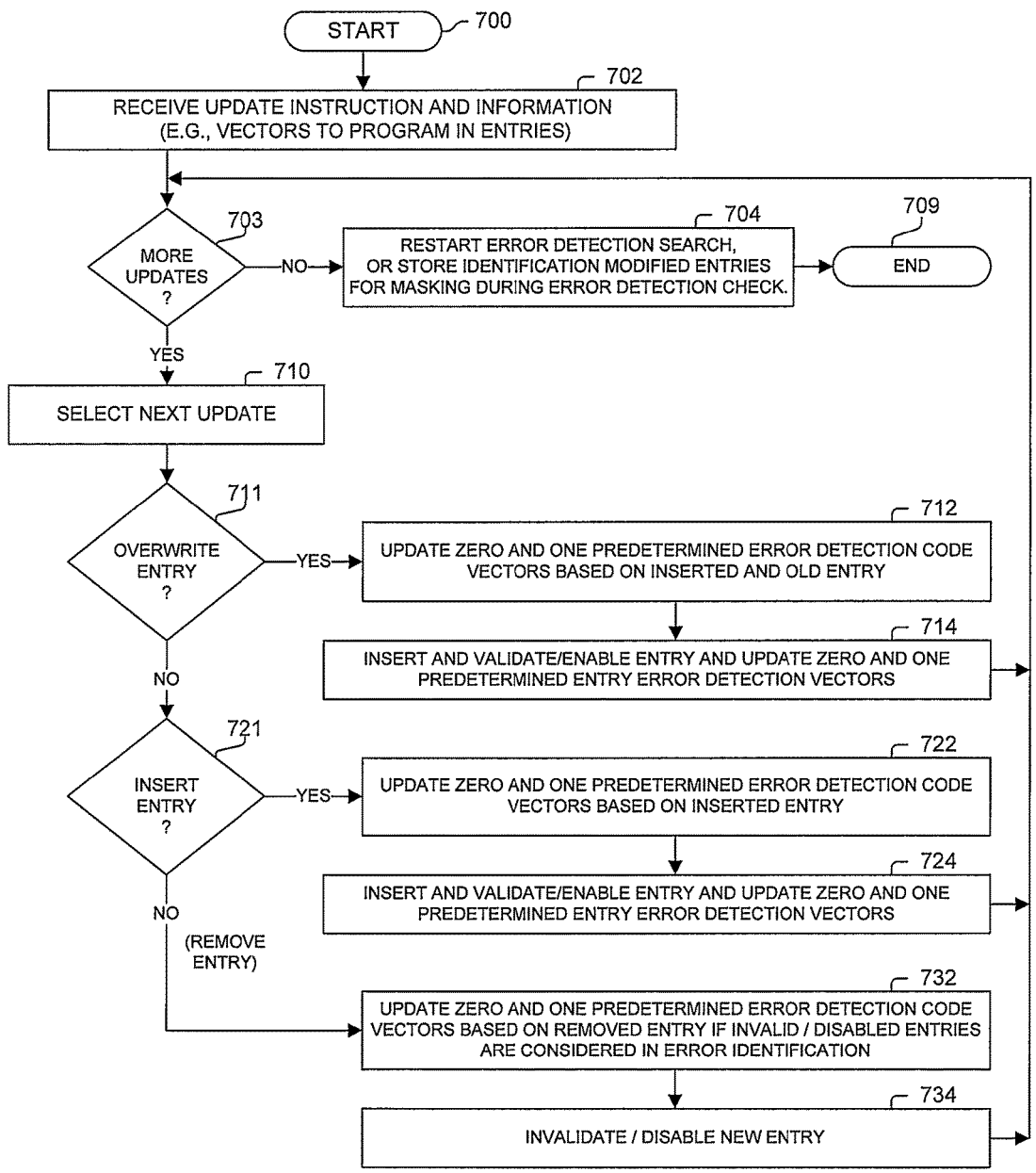
FIG. 7 illustrates a process according to one embodiment.

FIG. 7 illustrates a process performed in one embodiment for copying, inserting, or deleting entries from a content-addressable memory using efficient content-addressable memory entry integrity checking based on single-bit position lookup operations. The predetermined error detection code vector for each single-bit position zero and one (e.g., item 450 of FIG. 4A) needs to be updated to reflect any change in the set of entries that participate in determining a single-bit position match vector (e.g., item 311 of FIG. 3, item 431 of FIG. 4A).

One embodiment performs this content-addressable memory entry integrity checking for only entries that are currently valid/enabled. Therefore, the predetermined error detection code vector for each single-bit position zero and one needs to be updated to reflect any change in the set of valid/enabled entries. A copy is considered either an overwrite or insert entry depending on the prior state of the destination entry. A move is considered (a) either an overwrite or insert entry depending on the prior state of the copy operation and (b) a remove operation.

One embodiment performs this content-addressable memory entry integrity checking for all entries, regardless of whether they are currently valid/enabled. Therefore, changing (insertion, overwriting, removing) of an entry amounts to an overwriting operation in FIG. 7. In one embodiment, removing is performed by simply invalidating the entry, and not by a full overwriting.

As one embodiment uses parity and XOR operations in determining each predetermined error detection code vector, a new predetermined error detection code vector is a function of the old predetermined error detection code vector XOR'd with a search result value for each single-bit position correspondingly of zero (SR0) and of one (SR1) for the new vector ("SR0(new)", "SR1(new)") for insertion and overwriting and/or a search result value for each single-bit position correspondingly of zero or one of the previously stored vector "SR0(old)", "SR1(old)" for removing and overwriting.

Processing begins with process block 700. In process block 702 instructions are received (e.g., by a content-addressable memory controller) to change (e.g., copy, move, overwrite, insert, or delete) one or more entries and with any new vectors to be programmed into an entry. For purposes of the processing of FIG. 7, a move operation is considered two operations: an insertion or overwrite entry, and a remove entry.

As determined in process block 703, while there are more updates to perform, processing proceeds to process block 710 to select and process a next update; otherwise processing proceeds to process block 704.

Continuing with process block 710, a next update is selected.

As determined in process block 711, if an entry is to be overwritten, then processing proceeds to process block 712; else processing proceeds to process block 721.

Continuing with process block 712, the predetermined error detection code vectors for the single-bit position value of zero and one are updated based on the programmed old vector and new vector of the entry. In process block 714, the update entry is programmed with its new vector (received or read from another entry), and the corresponding bit position of the predetermined entry is updated to reflect the parity of the newly programmed entry. Processing returns to process block 703.

As determined in process block 721, if an entry is to be inserted, then processing proceeds to process block 722; else processing proceeds to process block 732 to remove an entry (the third possibility of the case condition determination).

Continuing with process block 722, the predetermined error detection code vectors for the single-bit position value of zero and one are updated based on the programmed new vector of the entry. In process block 724, the update entry is programmed with its new vector (received or read from another entry), and the corresponding bit position of the predetermined entry is updated to reflect the parity of the newly programmed entry. Processing returns to process block 703.

Continuing with process block 732, the predetermined error detection code vectors for the single-bit position value of zero and one are updated based on the invalidated/disabled entry (if a disabled entry is not considered in determining a single-bit position match vector for error identification). In process block 734, the update entry is marked as invalidated/disabled. Processing returns to process block 703.

Continuing in process block 704, as the updating of a content-addressable memory entry might (and typically will) affect the errored entry determination, one embodiment either restarts the error detection (e.g., restarts processing of FIG. 6) or masks the relevant entries modified by the processing of FIG. 7 from the comparison operation between the predetermined and cumulative entry error detection vectors comparison operation (e.g., in process block 624 of FIG. 6 and only for the current iteration of the single-bit position processing loop of beginning with process block 603). Processing of the flow diagram of FIG. 7 is complete as indicated by process block 709.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    performing a single-bit position lookup operation in a plurality of content-addressable memory entries against a particular bit value at a particular single-bit position within a lookup word resulting in a match vector that includes an entry match result for each of the plurality of content-addressable memory entries;
    determining an error detection value for the match vector;
    comparing the error detection value to a predetermined detection code for the single-bit position to identify an error in the particular single-bit position of at least one of the plurality of content-addressable memory entries;
    based on the match vector, a lookup unit updating a particular cumulative entry error detection vector storing entry error detection information for each of the plurality of content-addressable memory entries, with the particular cumulative entry error detection vector being a combined result of said performing the single-bit position lookup operation for a plurality of different said single-bit positions; and
    the lookup unit comparing the particular cumulative entry error detection vector to a predetermined entry error detection vector to determine a specific entry of the plurality of content-addressable memory entries that has said identified error in the particular single-bit position.

2. The method of claim 1, including responsive to said identifying the specific entry as having an error, writing the specific entry with a correct programming vector.

3. The method of claim 1, wherein responsive to said comparing the error detection value to the predetermined detection code identifying said error in the particular single-bit position, correcting said at least one error in the single-bit position of at least one of the plurality of content-addressable memory entries.

4. The method of claim 1, wherein each of the error detection value for the match vector and the predetermined detection code is a parity bit.

5. The method of claim 4, wherein each of the plurality of content-addressable memory entries is a ternary content-addressable memory entry.

6. The method of claim 1, wherein said performing the lookup operation includes using a global mask value to mask all bit positions except the particular single-bit position.

7. The method of claim 1, including responsive to said determining the specific entry as having an error, the lookup unit correcting the bit value at the particular single-bit position of the specific entry.

8. An apparatus, comprising:
    a content-addressable memory performing a single-bit position lookup operation in a plurality of content-addressable memory entries against a particular bit value at a particular single-bit position within a lookup word resulting in a match vector that includes an entry match result for each of the plurality of content-addressable memory entries;
    bit-operation hardware logic determining an error detection value for the match vector and updating a particular cumulative entry error detection vector storing entry error detection information for each of the plurality of content-addressable memory entries, with the particular cumulative entry error detection vector being a combined result of said performing the single-bit position lookup operation for a plurality of different said single-bit positions;
    comparison hardware logic that compares the error detection value to a predetermined detection code for the single-bit position and the particular bit value to identify an error in the particular single-bit position of at least one of the plurality of content-addressable memory entries and that compares the particular cumulative entry error detection vector to a predetermined entry error detection vector to determine a specific entry of the plurality of content-addressable memory entries that has said identified error in the particular single-bit position.

9. The apparatus of claim 8, wherein the apparatus writes the specific entry with a correct programming vector in response to said identifying the specific entry as having an error.

10. The apparatus of claim 8, wherein the apparatus corrects the bit value at the particular single-bit position of the specific entry in response to said determining the specific entry and said identifying the error in the particular bit-position.

* * * * *